INVENTOR
Roy D. Kisbey
BY
ATTYS

Patented June 5, 1945

2,377,430

UNITED STATES PATENT OFFICE 2,377,430

BRAKE STRUCTURE

Roy D. Kisbey, San Francisco, Calif.

Application February 23, 1944, Serial No. 523,525

9 Claims. (Cl. 188—90)

This invention relates to, and it is an object to provide, an improved brake structure for motor vehicles, such brake structure being arranged so that the conventional brake shoes and linings are eliminated.

A further object of this invention is to provide a novel brake structure which employs a liquid, such as oil, confined in a circulating system in said brake structure; the system including a fixed part and a cooperating rotary part normally functioning to circulate the oil through said system, and there being means to selectively restrict said flow whereby to produce a retarding effect on said rotary part and a braking action on the wheel to which said rotary part is connected.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
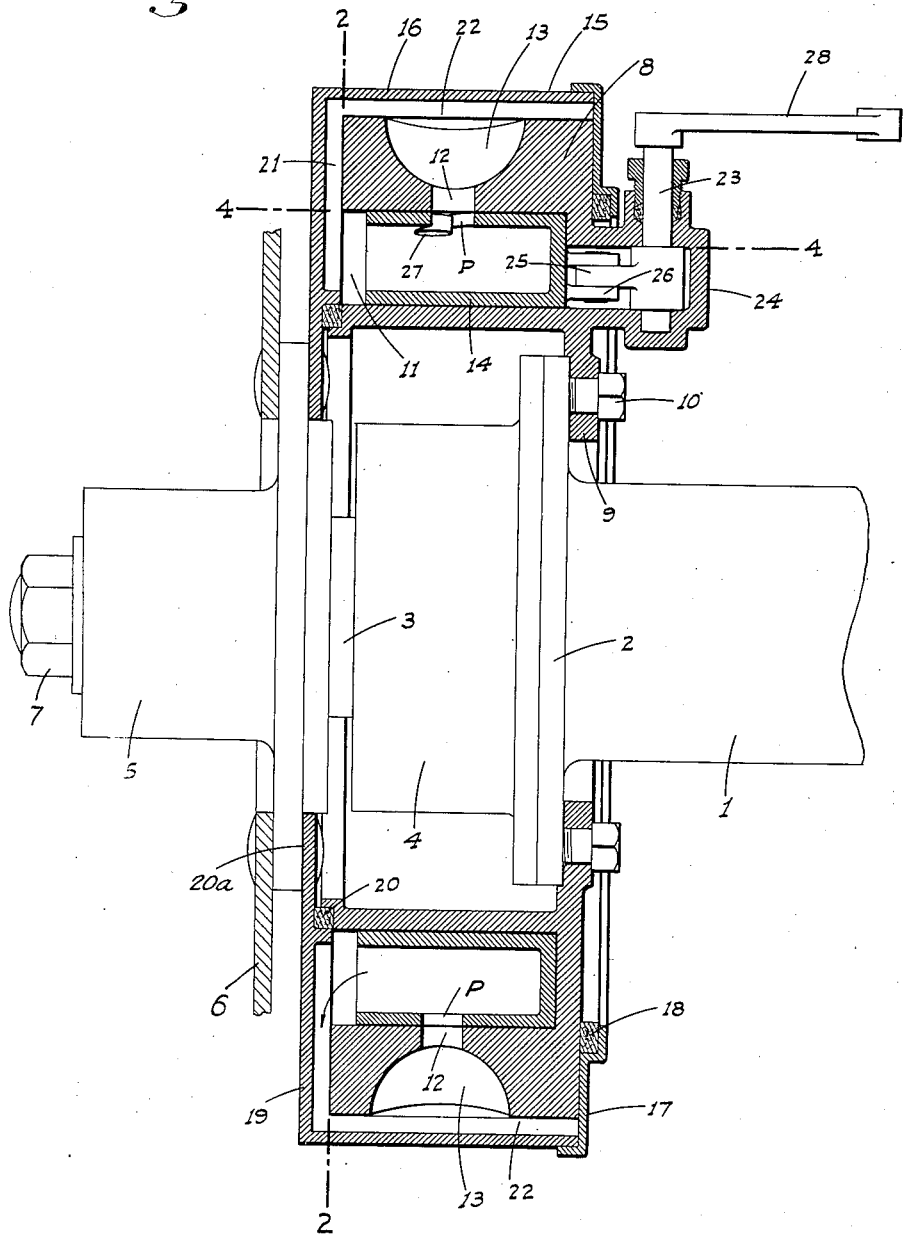
Figure 1 is diametral section illustrating the invention as incorporated in a rear wheel assembly of a motor vehicle.
Figure 2:
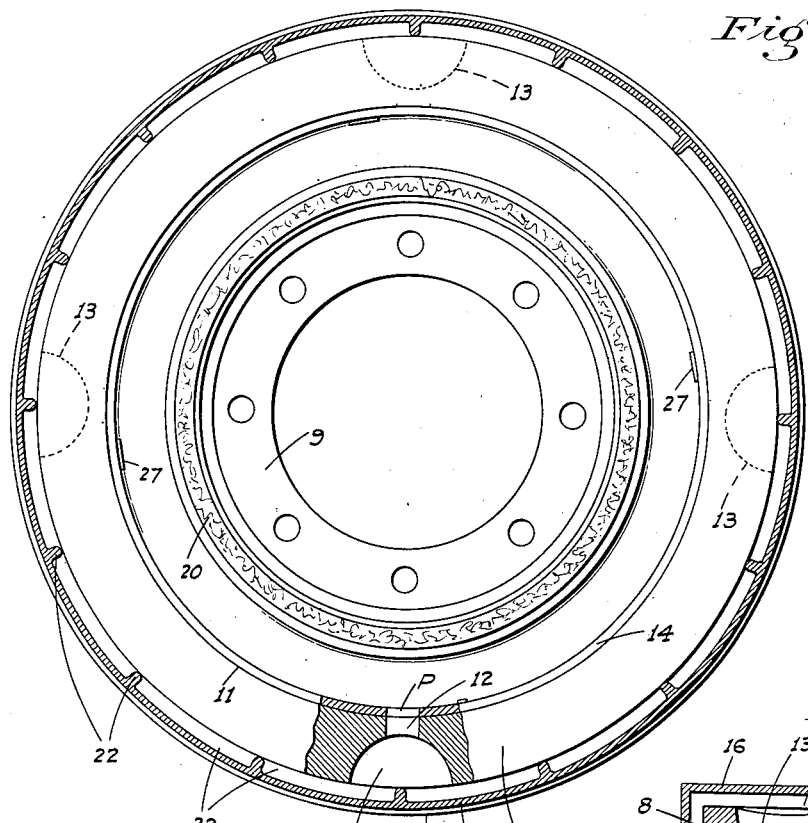
Figure 2 is a sectional elevation on line 2—2 of Fig. 1.
Figure 3:
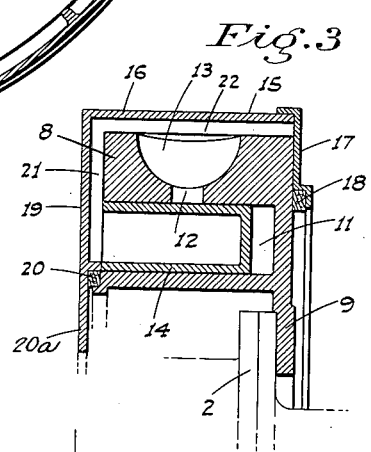
Figure 3 is a fragmentary radial section showing the annular sleeve valve in closed position.
Figure 4:
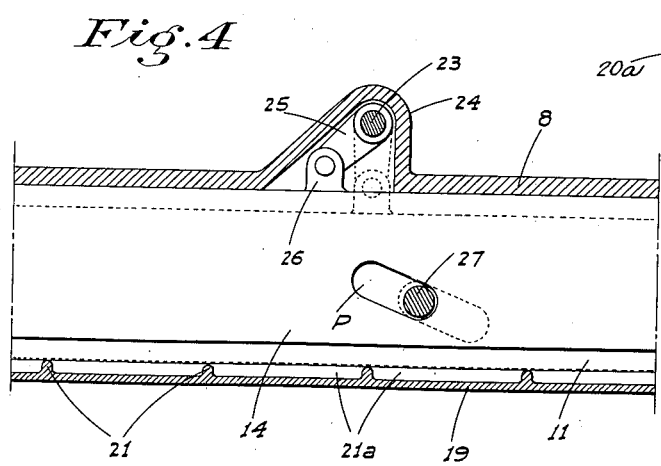
Figure 4 is a cross section on line 4—4 of Fig. 1.

Referring now more particularly to the characters of reference on the drawings, the numeral 1 indicates the rear axle housing of a motor vehicle, such housing including at its outer end a radial flange 2; the drive axle 3 projecting outwardly beyond a bearing 4 and having the hub 5 of the rear wheel 6 secured thereon by means of a retaining nut 7.

An annular body 8 is disposed inwardly of the wheel 6 and surrounds the bearing 4 in spaced relation; such body including an inwardly extending annular flange 9 which laps the flange 2 and is secured thereto by cap screws 10. It will thus be seen that the body 8 is fixedly and non-turnably supported from the housing 1.

The body 8 includes an annular groove 11, of substantial depth, opening to the outside of said body, and such groove is concentric to the axle 3. A plurality of circumferentially spaced radial passages 12 are formed in the body 8 in communication between the groove 11 and the periphery of such body; these passages being enlarged at their outer ends, as shown, to form oil receiving pockets 13 of substantially semi-spherical configuration.

An annular sleeve valve 14 is disposed in groove 11 with a relatively close running fit, said sleeve valve being closed at its inner end and open at the end adjacent the open end of groove 11. As shown, the sleeve valve 14 is shorter axially than the depth of groove 11, whereby when the sleeve valve is fully seated in said groove the outer end of the valve is disposed short of the outer end of groove 11 to permit of sliding movement of the valve in the groove without any portion of the valve projecting from the body. The sleeve valve 14 includes a plurality of elongated diagonal ports P which register with the inner end of passages 12 when said sleeve valve is retracted or fully seated in groove 11.

The body 8 is surrounded by an annular case 15 which includes an outer wall 16 dsiposed adjacent but spaced from the periphery of the body 8; a side wall 17 running in close engagement with the inner face of body 8 and including a seal 18; and an opposite side wall 19 disposed adjacent but spaced from the outer face of body 8 and including a seal 20 cooperating with the body radially inwardly of the groove 11. The side wall 19 extends radially inwardly from the body as a supporting disc 20a fixed in connection with the wheel 6, whereby the case 15 rotates with said wheel.

The side wall 19 of case 15 includes, on its inner face, a plurality of relatively closely disposed but circumferentially spaced ribs or vanes 21 which extend radially from adjacent the seal 20 to the end wall 16 of the case, and which may have a curvature similar to the vanes of a centrifugal pump. At their outer end, vanes 21 merge with matching ribs or vanes 22 formed on the inner face of end wall 16 and extending the full width thereof. The vanes 21 and 22 engage with a close running fit with the outer face and the periphery, respectively, of body 8; said periphery of the body being relatively wide.

The interior of sleeve valve 14; passages 21a between vanes 21; passages 22a between vanes 22; passages 12; and ports P form a closed circulating system which is normally substantially full of a liquid such as oil. With rotation of the wheel 6 and case 15 the vanes 21 create a relatively forceful circulation in said system in the direction shown by the arrow in Fig. 1.

To produce a braking action the sleeve valve 14 is shifted axially in the direction of the side wall 19 sufficient to partially or wholly close ports P relative to the passages 12. When this occurs the oil flow in the circulating system is restricted or stopped, causing a back pressure against the vanes 22 and a retarding effect on the case 15. This retarding effect is of course transmitted as a braking action to the wheel 6.

The sleeve valve 14 is mechanically shifted axially between open and closed positions, by suitable means such as a spindle 23 journaled in a hollow boss 24 formed on the body 8 inwardly of side wall 17 of case 15. A radial finger 25 is fixed on the inner end portion of spindle 23 and is pivotally connected at its outer end between a pair of ears 26 secured on the inner end of sleeve valve 14. Radial pins 27 project into groove 11 from body 8 and ride in ports P beyond passages 12, whereby upon swinging movement of the finger 25 to cause axial and rotative shifting movement of said valve and consequent progressive closing-off of passages 12. The spindle 23 includes an exterior radial arm 28 which is adapted for connection with the brake linkage which leads to the brake pedal in the operator's compartment of the vehicle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A brake structure comprising a circular body, an annular rotary case surrounding the peripheral portion of the body and sealed therewith radially inward of said portion, there being a normally open passage system extending in part between the body and case, said passage system being substantially filled with a liquid, means including impeller vanes on the case cooperating with the body and disposed in said part of the passage system to circulate the liquid through said system, and manually controlled means to restrict flow through said passage system to a selective extent.

2. A brake structure comprising a circular body, an annular rotary case surrounding the peripheral portion of the body and sealed therewith radially inward of said portion, there being a normally open passage system extending in part between the body and case, said passage system being substantially filled with a liquid, means including impeller vanes on the case cooperating with the body and disposed in said part of the passage system to circulate the liquid through said system, and manually controlled means to restrict flow through said passage system to a selective extent; said passage system including another part within the body, and said manually controlled means being a valve arranged to control flow through said body included portion of the passage system.

3. A brake structure comprising a circular body, an annular rotary case surrounding the peripheral portion of the body and sealed therewith radially inward of said portion, the case including an end wall and a side wall disposed adjacent but spaced from the periphery and one face of the body respectively, a plurality of circumferentially spaced impeller vanes formed on the inner face of the end wall and said side wall of the case and engaging, respectively, with the periphery and said one face of the body with a close running fit, adjacent ends of corresponding side wall and end wall vanes merging, there being a normally open passage extending through the body from the periphery to said one face thereof at a point in the path of rotation of the radially inner end portions of the vanes on the side wall of the case, and a manually controlled valve operative to selectively restrict flow through said passage.

4. A brake structure comprising a circular body, an annular rotary case surrounding the peripheral portion of the body and sealed therewith radially inward of said portion, the case including an end wall and a side wall disposed adjacent but spaced from the periphery and one face of the body respectively, a plurality of circumferentially spaced impeller vanes formed on the inner face of the end wall and said side wall of the case and engaging, respectively, with the periphery and said one face of the body with a close running fit, adjacent ends of corresponding side wall and end wall vanes merging, there being a plurality of circumferentially spaced normally open passages extending through the body from the periphery to an annular groove formed in the body and open to said one face thereof in the plane of rotation of the radially inner end portions of the vanes on the side wall of the case, and a manually controlled valve in said groove operative to simultaneously restrict flow through said passages to a selective extent.

5. A brake structure as in claim 4 in which said valve is an annular sleeve valve open at the end adjacent said side wall of the case, ports formed in said sleeve valve normally in register with said passages, and manually operative means to shift the sleeve valve in a direction to dispose said ports out of register with said passages.

6. A brake structure as in claim 4 in which said valve is an annular sleeve valve open at the end adjacent said side wall of the case, ports formed in said sleeve valve normally in register with said passages, and manually operative means to shift the sleeve valve in a direction to dispose said ports out of register with said passages; said ports being elongated and diagonally disposed, and said last named means including pins fixed on the body in the groove and riding in said ports.

7. A brake structure as in claim 4 in which the periphery of the body is relatively wide; the vanes on the end wall of the case extending full width of said periphery, and the adjacent ends of the passages being enlarged.

8. A brake structure comprising a circular body, an annular rotary case surrounding the peripheral portion of the body and sealed therewith radially inward of said portion, the case including an end wall and a side wall disposed adjacent but spaced from the periphery and one face of the body respectively, a plurality of circumferentially spaced impeller vanes formed on the inner face of the end wall and said side wall of the case and engaging, respectively, with the periphery and said one face of the body with a close running fit, adjacent ends of corresponding side wall and end wall vanes merging, there being a plurality of circumferentially spaced normally open passages extending through the body from the periphery to an annular groove formed in the body and open to said one face thereof in the plane of rotation of the radially inner end portions of the vanes on the side wall of the case, said groove being of substantial depth, an annular sleeve valve disposed in said groove, said valve being open at the end adjacent the open end of the groove and closed at the other end, the valve when fully seated in the groove terminating short of said open end of the groove, ports formed in said valve normally in register with the passages, and means to impart limited rotation to the sleeve valve and simultaneous movement thereof toward the open end of the groove, whereby to move the ports out of register with said passages.

9. A brake structure comprising a circular body, an annular rotary case surrounding the peripheral portion of the body and sealed therewith radially inward of said portion, there being a normally open passage system having one part extending through the body and another part extending between the case and body, said system being filled with a liquid, means on the case in said other part of the passage system operative to circulate the liquid therethrough, and a valve in said one part of the passage system operative to restrict flow therethrough to a selective extent.

ROY D. KISBEY.